United States Patent [19]

Meadors

[11] 4,127,378
[45] Nov. 28, 1978

[54] APPARATUS FOR COLD-FORMING PLASTIC SHEET

[75] Inventor: William R. Meadors, Marion, Ind.

[73] Assignee: Peerless Machine & Tool Corporation, Marion, Ind.

[21] Appl. No.: 852,249

[22] Filed: Nov. 17, 1977

Related U.S. Application Data

[60] Continuation of Ser. No. 759,634, Jan. 17, 1977, abandoned, which is a division of Ser. No. 619,377, Oct. 3, 1975, abandoned.

[51] Int. Cl.² .............................................. B29C 17/00
[52] U.S. Cl. .................................... 425/398; 425/394; 425/324.1; 425/391; 425/392; 425/397
[58] Field of Search ................... 425/324 R, 398, 393, 425/127, 392, 391, 397

[56] References Cited

U.S. PATENT DOCUMENTS

| | | | |
|---|---|---|---|
| 3,357,053 | 12/1967 | Lyon et al. | 425/324 X |
| 3,444,282 | 5/1969 | Burkett | 425/398 X |
| 3,484,510 | 12/1969 | Corazza | 425/127 X |
| 3,584,109 | 6/1971 | Meadors et al. | 425/398 X |
| 3,695,806 | 10/1972 | Arfert | 425/398 |
| 3,912,438 | 10/1975 | Podovain | 45/324 R X |

*Primary Examiner*—J. Howard Flint, Jr.
*Attorney, Agent, or Firm*—Jenkins, Coffey & Hyland

[57] ABSTRACT

Apparatus for cold-forming a thermoplastic sheet to provide a circular container part such as a lid or dish comprising opposing concentric die members for engaging a sheet of thermoplastic material, the sheet being drawn around the circular edge of one of the die members to provide a concentric central portion and a concentric annular depending skirt having a proximal edge adjacent the central portion, an intermediate portion, and a distal free edge, providing an annular void in the die members adjacent the skirt. Apparatus is provided for moving the free edge toward the proximal edge while holding the proximal edge to buckle the intermediate portion into the void. The void has a tapered surface inclining radially outwardly and axially toward the proximal edge to hold the free edge radially inwardly, thereby to permit the intermediate portion to buckle outwardly into the void.

6 Claims, 7 Drawing Figures

APPARATUS FOR COLD-FORMING PLASTIC SHEET

This is a continuation of U.S. Pat. application Ser. No. 759,634, filed Jan. 17, 1977 and now abandoned, which was a division of U.S. Pat. Application Ser. No. 619,377, filed Oct. 3, 1975 and now abandoned.

The present invention relates to cold-forming of thermoplastic sheet to provide containers and container parts including lids sealed to containers. The present invention involves buckling regions of the sheet material to provide sealing beads rather than curling edges of the material as is conventional.

Reference is made to such patents as U.S. Pat. Nos. 3,584,109 issued June 8, 1971, 3,634,579 issued June 11, 1972 and 3,751,552 issued Aug. 7, 1973. These prior United States Patents in which I am listed as an inventor or a co-inventor disclose method and apparatus for cold-forming thermoplastic sheet materials to provide containers and parts thereof such as lids for containers. These prior patents teach "curling" of peripherally extending edges to provide sealing beads. Reference is also made to the R. D. Lurie U.S. Pats. Nos. 3,231,937 issued Feb. 1, 1966, 3,248,000 issued Apr. 26, 1966 and 3,276,616 issued Oct. 4, 1966.

The present invention is directed toward the concept of "buckling" the material rather than "curling" the material.

According to the present invention, apparatus is provided for, broadly speaking, forming a center panel and a depending skirt and then moving the free edge or distal edge of the depending skirt relative to the panel to buckle a portion of the skirt into a void in the die. The present invention contemplates having a void machined into the die members to accommodate the buckling of the skirt or having two separate portions of the die separate to create a void into which the skirt material is buckled. One advantage of the present invention is that any number of steps or rings or combinations thereof including one ring or step right at the level of the center panel can be formed. Usually, on a lid, a snap ring or snap bead will be formed on the free edge of the skirt and then other rings or steps such as stacking rings will be formed.

The apparatus of the present invention is useful for cold-forming thermoplastic sheet material such as a material known commercially as "ABS" plastic which is technically acrylonitrile butadiene styrene. While "ABS" plastic is presently believed to be ideal for cold-forming, it will be appreciated that other plastics may be cold-formed by the method and apparatus of the present invention and, in fact, non-plastic materials may be buckled to provide sealing beads, ridges, rings, etc., in accordance with the present invention.

Within the scope of the present invention, the flange of a lid may be buckled together with the flange of a container to provide a sealed connection between the lid and the container. In such a case, of course, the flange of the lid and the flange of the container will be layered together and handled as a single flange. Thus, in this description and in the claims appended hereto, the terms "skirt" and "flange" may refer to one or more layers of thermoplastic sheet material.

In the prior art curling techniques, the free edge or distal edge of a skirt is brought into engagement with a curling groove which turns the edge first radially outwardly and then backwardly on itself. With the apparatus of the present invention, the free edge is held radially inwardly and an intermediate portion of the skirt is forced to buckle because of the movement of the free edge toward the proximal edge or the fixed edge. The buckling may be internally or externally, depending upon the position of the void in the die members into which the buckling occurs.

An object of the present invention, therefore, is to provide apparatus for cold-forming a thermoplastic sheet to provide a circular container part such as a lid or dish, the apparatus comprising means for engaging a sheet of thermoplastic material between opposing concentric die members, drawing the sheet around the circular edge of one of the die members to provide a concentric central portion and a contric annular depending skirt having a proximal edge adjacent the central portion, an intermediate portion and a distal free edge, providing an annular void in the die members adjacent the skirt, and means for moving the free edge toward the proximal edge while holding the proximal edge to buckle the said intermediate portion into the void.

Another object of the present invention is to provide such an apparatus in which the central portion has an outer peripheral portion and an inner peripheral portion, the apparatus for holding the proximal edge including means for engaging the said outer peripheral portion between the die members, and further including apparatus for disengaging the outer peripheral portion while holding the inner portion between said die members, apparatus for producing an annular void above the outer peripheral portion, and apparatus for moving the buckled intermediate skirt portion upwardly to buckle the outer peripheral portion upwardly into the last said void.

Another object of the present invention is to provide an apparatus in which the improvement involves the annular void hving a first tapered surface for engaging the distal free edge, the tapered surface inclining axially upwardly and radially outwardly, and the tapered surface terminating, at its radially outer extent, in an annular cavity having an upper wall spaced axially upwardly from the tapered surface. In the preferred embodiment, the annular cavity has a lower wall disposed axially below the said tapered surface.

Other objects and features of the present invention will become apparent as this description progresses. In the drawings.

Figure 1:
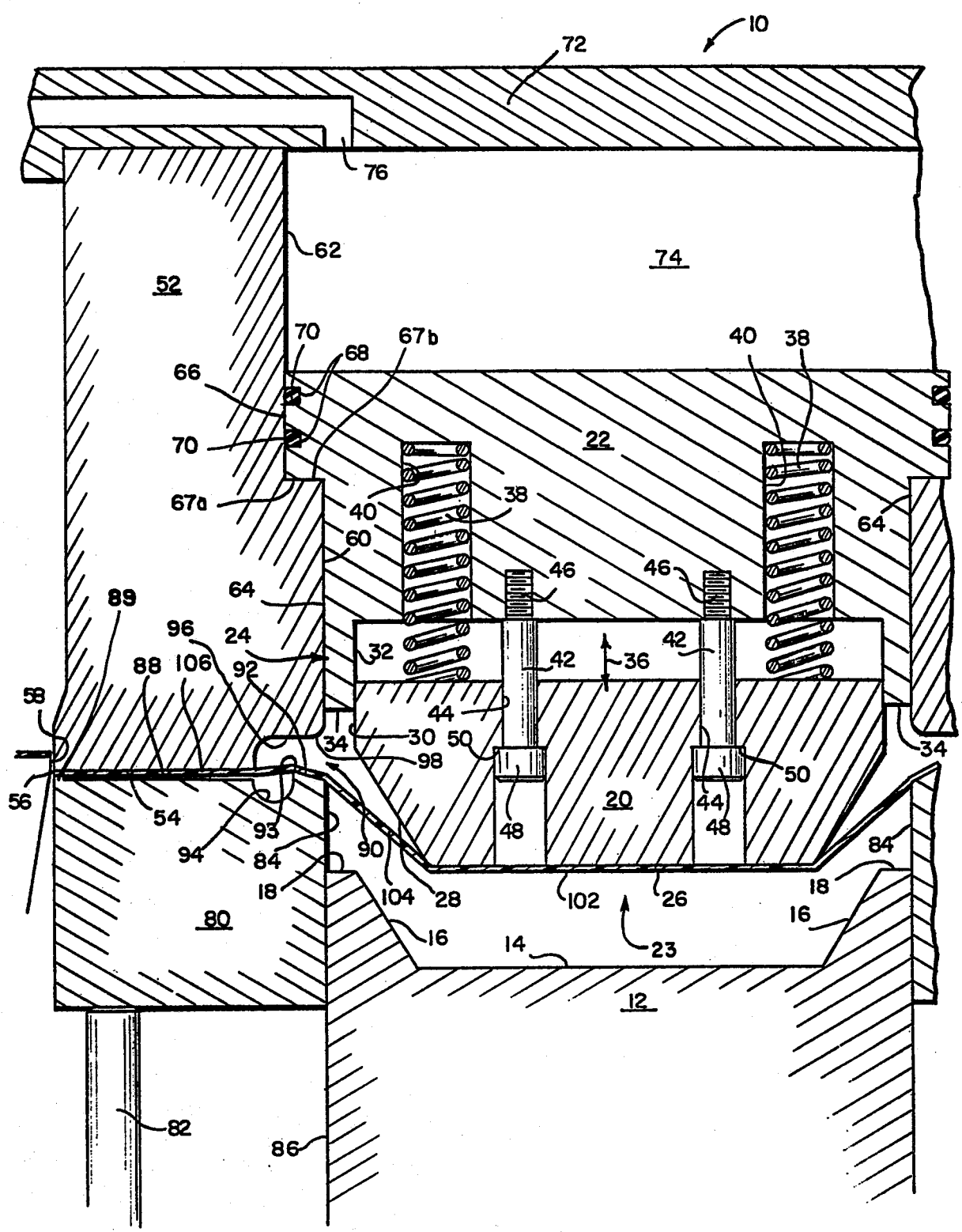
FIG. 1 is a fragmentary sectional view of a press in accordance with the present invention.

Referring now particularly to FIGS. 1–4, the apparatus of press 10 of the present invention will be discussed. The press 10 conventionally includes a horn or punch 12 which, in the illustrative embodiment, constitutes the basic reference surface or the surface relative to which the rest of the die members move and which provides an upwardly facing die surface including an inner flat circular portion 14, an intermediate conical annular portion 16 and a radially outer peripheral portion 18. Above the horn 12 is a knock-out member 20 having a flat, circular horizontal surface 26 in registry with the die surface 14, a conical surface 28 in registry with the die surface 16 and an outer cylindrical wall 30. The knock-out member 20 is carried by a piston 22 formed with a central cavity providing a cylindrical inner wall 32 telescopically receiving the outer wall 30 of the knock-out member 20. The piston 22, together with the knock-out member 20, constitute punch means 23 for cooperating with the horn 12 to define a concentric central portion of a lid or a container. The outer peripheral portion of the piston 22 terminates with an annular die surface 34 in registry with the outer peripheral portion 18. In this description and in the claims appended hereto, die members or portions thereof are said to engage other die members or portions thereof. In this context, the term "engaged" is intended to include the engagement of sheet material between said die members or portions thereof.

The arrow 36 represents the vertical movement of the knock-out member 20 relative to the piston 22, which movement is resisted in one direction by means of die springs 38 contained in openings 40 in the piston 22 to urge the knock-out member 20 downwardly. The downward movement of the knock-out member 20 is limited by means of bolts 42 which illustratively extend upwardly through holes 44 in the member 20 threadedly to engage the piston 22 as indicated at 46. The enlarged heads 48 of the bolts engage radially and peripherally inwardly extending ledges 50 formed in the openings 44 to limit the downward movement of the knock-out member 20.

The press 10 also illustratively includes a concentric annular upper draw pad 52 providing a draw pad surface 54 extending radially outwardly and peripherally and perpendicularly to the axis of the press. The outer edge 56 of this draw pad surface 54 cooperates with an annular shear ring 58 to cut a circular disc of plastic sheet material from a strip being fed through the press 10. The piston 22 reciprocates in the cylindrical bore of the upper draw pad 52 which is formed to define a lower internal diameter cylindrical wall surface 60 and an upper and larger internal diameter cylindrical wall surface 62. The piston 22 is provided with an outer cylindrical surface 64 telescopically engaging the inner surface 60 and an outer surface 66 telescopically engaging the inner surface 62. Annular grooves 68 are formed in the surface 66 and contain O-rings 70 to provide a seal between the piston 22 and the cylindrical surface 62. An end plate 72 encloses the upper end of the draw pad 52 to define a cylindrical chamber 74 into which driving fluid such as air is admitted through an inlet opening 76 to control the movement of the piston 22.

The press 10 also includes a concentric annular lower draw pad 80 in vertical registry with the upper draw pad 52. This lower draw pad 80, which is supported by an air cushion or spring indicated at 82, has an internal diameter cylindrical surface 84 in registry with the internal surface 60 of the upper draw pad 52 and telescopically movable on the outer cylindrical wall 86 of the horn 12. The draw pad 80 provides an upwardly facing draw pad surface 88, the radially outer portion of which is provided with an upwardly and peripherally extending shoulder 89. Such a shoulder 89 and the draw pad surfaces 54 and 88 are discussed in my said prior U.S. Pat. No. 3,584,109. Particularly, the space between the draw pad surfaces 54, 88 is controlled by the height of the shoulder 89 which may be, for instance, 20% to 30% less than the thickness of the sheet material being cold-formed. Once the material is drawn inwardly off the shoulder 89, the shoulder engaging the downwardly facing surface 54 provides a controlled draw pad spacing and, consequently, a controlled pressure applied to the thickness of the material. This prevents "pinch off" when the material is on the radially innermost edge of the draw pad surfaces.

The illustrative draw pads 52, 80 are formed to provide a radially inwardly opening void 90. Particularly, the radially innermost edge portions of the surfaces 54, 88 are formed to provide a void 90 which is defined, in part, by a tapered surface 92 which is an annular surface inclining radially outwardly and axially upwardly, and facing radially inwardly and axially upwardly. The tapered surface 92, which is illustratively inclined at an angle of 22½°, functions in a manner to be described hereinafter in conjunction with FIGS. 2-4. The radially outer extent 93 of the tapered surface 92 terminates in an annular cavity defined, in radial cross section, by a generally U-shaped cross section lower wall 94 spaced axially below the tapered surface 92 and an upper wall 96 spaced above the tapered surface. The edge between the wall 96 and the cylindrical wall 60 is rounded as indicated at 98.

In FIG. 1, the sheet of thermoplastic material is shown having an inner circular portion 102 which is disposed between the surfaces 14, 16, an annular portion 104 disposed between the surfaces 16, 28 and an outer annular portion 106 disposed between the surfaces 54, 88.

FIG. 1 shows, therefore, that a blank of material (circular) is cut from a strip at the shear ring 58. The upper draw pad 52 is shown engaged with the lower draw pad 80 with the sheet material therebetween. The knock-out member 20 moves downwardly with the piston 22 into contact with the blank center portion as the preliminary start of the cold-form operation. The movement of the upper draw pad 52 downwardly moves the lower draw pad 80 downwardly against the urging of the means 82. Air pressure moving the piston 22 downwardly, of course, moves the draw pad 52 downwardly because of the engagement of the shoulders 67a and 67b. In the press 10, as shown in the aforesaid prior U.S. patents, additional means (not shown) may be provided for driving the draw pad 52 upwardly and downwardly.

Figure 2:
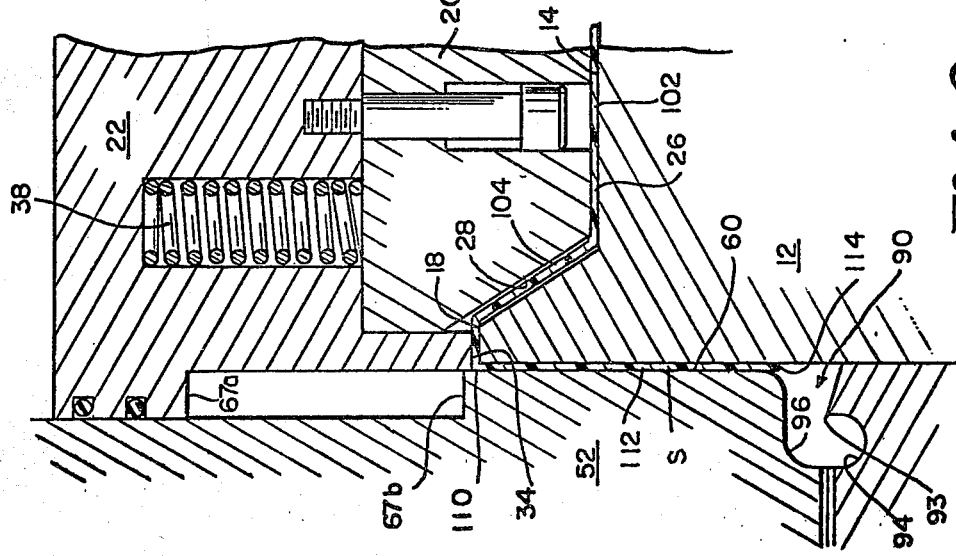

Turning to FIG. 2, it will be seen that the next sequence of operation involves the movement of the draw pads 52, 80 downwardly to draw the outer peripheral edge portion 106 of the blank downwardly about the horn 12 to define a skirt S. In the sequence illustrated in FIG. 2, the knockout member 20 is down against the horn 12 and the die surfaces 18, 34 are engaging and holding the material therebetween. The sequence of FIG. 2 represents the bottom of the forming stroke with the skirt S having an upper or proximal edge 110, an intermediate portion 112 and a lower or distal free edge 114. The engagement of the die surfaces 18, 34 holds the proximal edge of the skirt S fixed relative to the horn 12.

Figure 3:
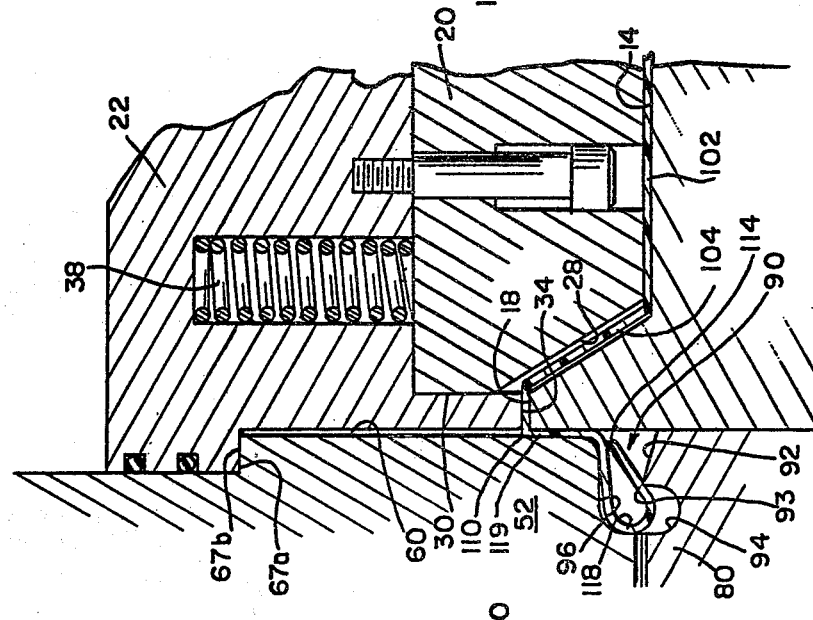

Then, referring to the sequence illustrated in FIG. 3, it will be seen that the draw pads 52, 80 have moved axially upwardly relative to the horn 12 to buckle the intermediate portion 112 outwardly into the void 90 to provide a bead indicated at 118. The tapered surface 92, as it moves upwardly relative to the horn 12, engages the free edge 114 of the skirt S and holds it radially inwardly against the horn 12, thereby controlling the material and forcing it to buckle into the void 90 rather than curling in conventional fashion. It will be noted that the lower wall 94 of the annular cavity merely provides clearance for the buckling. The wall 96 provides the surface facing the direction from which the buckling force is applied and does the actual forming of the buckled region.

Figure 4:
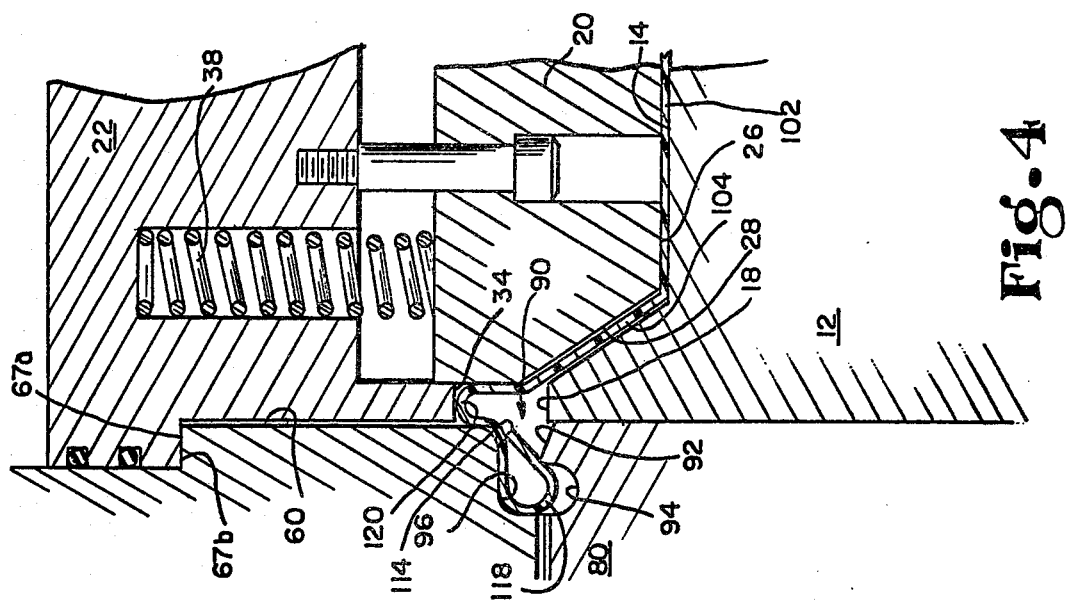
FIGS. 2, 3 and 4 are fragmentary sectional views showing the apparatus of the present invention.

Before referring to FIG. 4, it will be noted that in FIG. 3 the shoulders 67a, 67b are in engagement such that further upward movement of the draw pads 52, 80 will raise the piston 22. Referring to FIG. 4, then, it will be seen that the knock-out member 20 is held downwardly by the die springs 38 to maintain control of the material portions 102, 104. The movement of the surface 34 upwardly relative to the surface 18, however, creates a second void bounded generally by the surfaces 18, 34 and the outer diameter surface 30 and the inner diameter surface 60. Moving the buckled region 118 upwardly in the void 90 works on the portion of the material indicated at 119 to provide a second buckled region 120 which may serve, for instance, as a stacking ring for the part.

The apparatus of the present invention, therefore, moves a free edge 114 toward a fixed edge 110 to buckle the intermediate portion therebetween into a void either cut into the die members or even provided by separation of certain die members. The void may extend radially inwardly or radially outwardly as desired within the scope of the present invention. The taper or tilt of the surface 92 of a radially inwardly directed void is such that the tapered surface would face radially outwardly and axially toward the held edge 110 of the skirt S. A depending skirt S may be buckled radially inwardly or radially outwardly. In fact, the buckled portion does not have to be a depending skirt, it may be, for instance, a portion such as that portion originally between the die surfaces 18, 34 as shown in FIG. 3.

Figure 5:
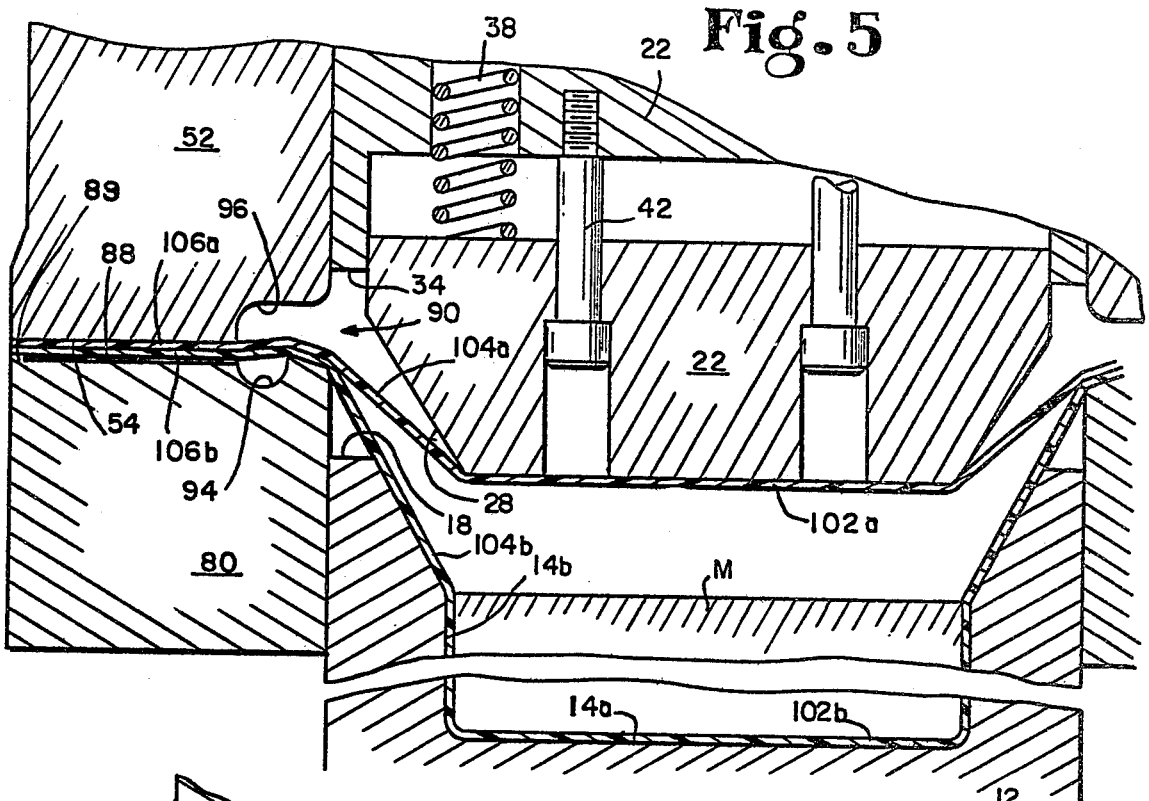
FIG. 5 is a fragmentary sectional view similar to FIG. 1 and showing how a lid and container are connected together by the buckling apparatus of the present invention.
Figure 6:
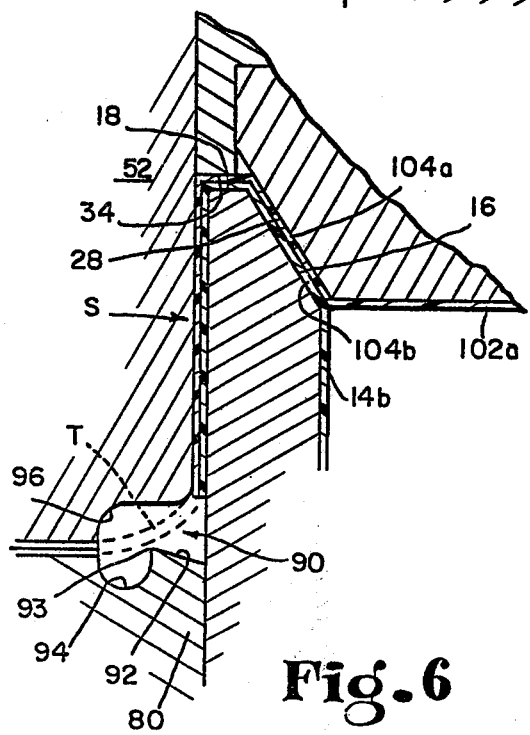
FIG. 6 is an enlarged fragmentary sectional view of a portion of FIG. 5 showing the beginning of formation of the connection between the lid and container.
Figure 7:
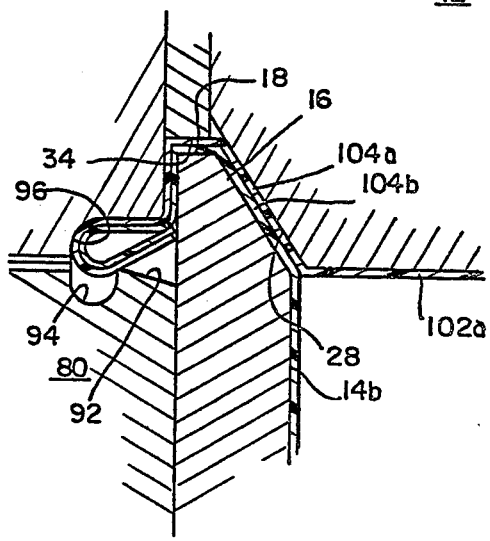
FIG. 7 is an enlarged fragmentary sectional view of FIG. 5 showing the completed connection.

Referring now to FIGS. 5, 6 and 7, it will be seen that the apparatus of the present invention is used to connect a lid to a container, like reference numerals representing like parts. In FIGS. 5-7, the upper sheet of material has portions 102a, 104a, 106a corresponding respectively to the previously discussed portions 102, 104, 106. The lower layer of material, i.e., the container, has portions 102b, 104b, 106b corresponding respectively to the portions 102, 104, 106 previously discussed. The horn 12 is formed with its central surface 14a considerably further below the surface 16 and separated therefrom by an outer cylindrical wall 14b. Thus, the horn 12 receives a preformed container, for instance, already filled with a material M, the pre-formed container having the conical flange 104b and the radially outwardly extending flange 106B. Once the two layers 106a and 106b are together between the surfaces 54, 88 of the draw pads 52, 80, the buckling operation is substantially the same as that disclosed in conjunction with FIGS. 1-4. Particularly, as shown in FIG. 6, the draw pads 52, 80 are lowered relative to the horn 12 to form a composite skirt S, the upper edge of which is secured between the die surfaces 18, 34. Then, as shown in FIG. 7, the draw pads 52, 80 are moved upwardly to buckle the composite skirt, thereby connecting the lid to the container.

Buckling in accordance with the present invention has numerous advantages, and substantial advantages, over curling as is conventional. First of all, and probably one of the most important advantages, has to do with the speed with which the material can be buckled. The single stroke buckling operation is considerably faster than curling operations previously utilized.

Further, and importantly, buckling allows shapes not previously obtainable by curling. The shape of a buckled region can be controlled or determined by controlling the shape of the void into which the material is buckled. Further, buckling permits a series of steps or rings while curling is, for all practical purposes, limited to the distal free edge.

Finally, buckling allows the provision of one or more tabs such as indicated in phantom at T in FIG. 6 extending downwardly from the free distal edge of the skirt. After the buckling is accomplished, such tabs can serve as "pull tabs" for the lid.

I claim:

1. An apparatus for cold-forming sheet material comprising a plurality of opposing concentric die members including a lower central horn providing an upwardly facing die surface and an outer cylindrical wall, upper punch means for engaging said die surface, said upper punch means having an outer cylindrical wall, a lower annular draw pad disposed telescopically about said horn outer cylindrical wall, an upper annular draw pad disposed telescopically about said upper punch means outer cylindrical wall, said draw pads being telescopically movable upwardly and downwardly about said horn and punch means cylindrical walls, said draw pads cooperating to define an annular void opening toward said horn outer cylindrical wall and into which a depending annular skirt drawn from said material is buckled, said shirt being drawn about said horn outer cylindrical wall to have a proximal edge adjacent said die surface of said horn, an intermediate portion, and a free distal edge, said void having a first taperd surface, means for moving said draw pads upwardly together to move said void and distal free edge relatively toward each other to engage said tapered surface with said distal free edge and prevent radially outward curling deflection of said distal free edge, said tapered surface facing axially upwardly and radially inwardly toward said horn outer cylindrical wall and terminating at its radially inner extent adjacent said horn outer cylindrical wall to hold said distal free edge against said radially outward curling deflection adjacent said horn outer cylindrical wall, said tapered surface further terminating at its radially outer extent in an annular cavity having an upper wall spaced axially upward from said tapered surface.

2. The apparatus of claim 1 in which said annular cavity has a lower wall disposed axially below said tapered surface.

3. The apparatus of claim 1 in which said horn upwardly facing die surface includes a radially outer peripheral portion adjacent said horn outer cylindrical wall and an inner portion, said upper punch means including an inner die member for engaging said inner portion and an outer die member for engaging said radially outer peripheral portion, means for moving said outer die member upwardly from said outer peripheral portion, means for simultaneously maintaining said inner die member in engagement with said inner portion to provide a second annular void, and means for moving the buckled intermediate portion of said skirt upward to buckle said material into said second annular void.

4. An apparatus for cold-forming a buckled region intermediate the opposite edges of a skirt, said apparatus comprising means providing an outer wall against which said skirt is disposed, means for providing an inner wall disposed opposite said outer wall and against said skirt, means for holding one of said opposite edges against movement relative to said outer wall, means providing a void in said inner wall, said void opening toward said outer wall, said void having a tapered surface for engaging the other of said opposite edges, and means for moving said inner wall to move said other edge toward said one edge and buckle said intermediate region into said void, said tapered surface facing radially outwardly and axially toward said means holding said one edge to prevent radially inward curling deflection of said other edge, said tapered surface terminating at its radially outer extent adjacent said outer wall and at its radially inner extent remote from said outer wall.

5. Apparatus for cold-forming plastic sheet material into an item, the apparatus including means for forming an axially extending skirt spaced radially from an axis of a central portion of the item, the skirt having a proximal edge adjacent the central portions and a distal edge remote from the central portion, the proximal and distal edges being joined together by an intermediate portion of the skirt, means for holding the two edges against radially outward curling deflection and for moving the edges axially toward one another, the apparatus defining a void adjacent the intermediate portion of the skirt, the skirt intermediate portion buckling into the void as the two held edges are moved axially relatively toward one another.

6. The apparatus of claim 5 and further including means for defining a second void adjacent the proximal skirt edge, means for releasing the holding means from the proximal skirt edge and means for moving the distal skirt edge toward the proximal edge to cause a second buckling of the plastic sheet into said second void.

* * * * *

UNITED STATES PATENT OFFICE
CERTIFICATE OF CORRECTION

Patent No. 4,127,378  Dated November 28, 1978

Inventor(s) William R. Meadors

It is certified that error appears in the above-identified patent and that said Letters Patent are hereby corrected as shown below:

Column 2, line 15, change "contric" to --concentric--;

line 38, change "hving" to --having--.

Column 6, line 36 (claim 1), change "taperd" to --tapered--;

line 49 (claim 1), change "upward" to --upwardly--.

Signed and Sealed this

First Day of May 1979

[SEAL]

*Attest:*

RUTH C. MASON
*Attesting Officer*

DONALD W. BANNER
*Commissioner of Patents and Trademarks*